April 22, 1924.
J. B. DES ROSIERS
1,491,586
EMERGENCY WHEEL RETAINING DEVICE
Filed Feb. 8, 1922
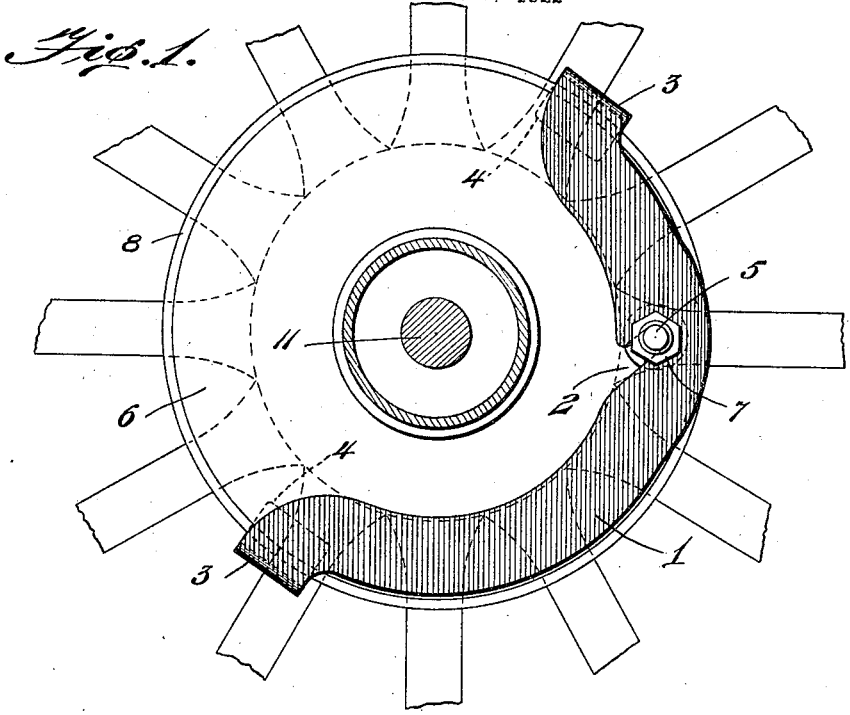
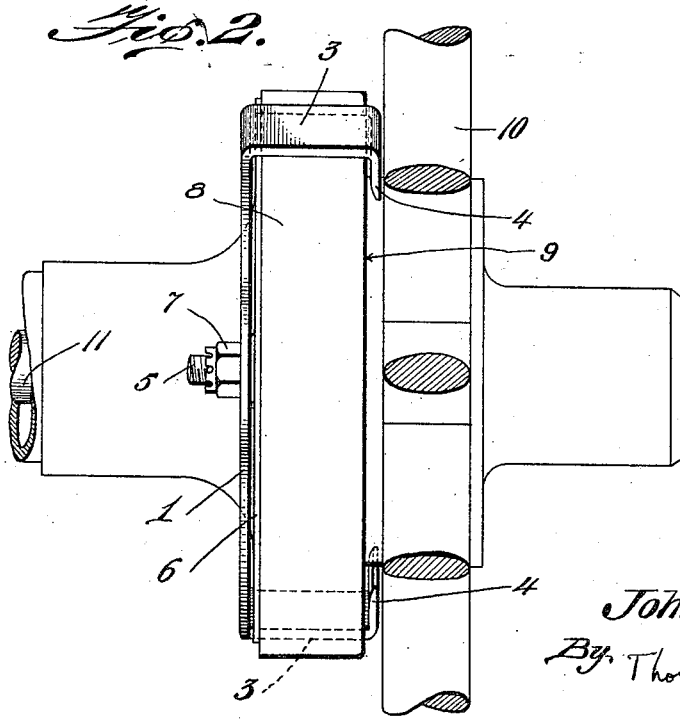
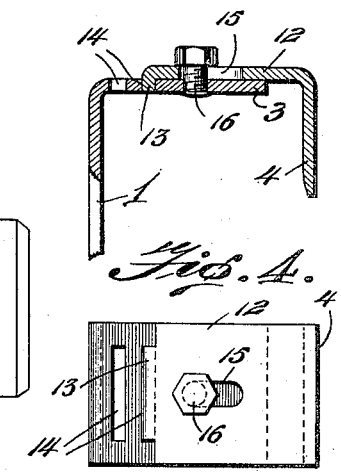
Inventor
John B. Des Rosiers,
By Thomas A. Jenckes Jr.
Attorney Patented Apr. 22, 1924.

1,491,586

UNITED STATES PATENT OFFICE.

JOHN B. DES ROSIERS, OF PROVIDENCE, RHODE ISLAND, ASSIGNOR TO DES ROSIERS PATENTS COMPANY, INC., OF PROVIDENCE, RHODE ISLAND, A CORPORATION OF RHODE ISLAND.

EMERGENCY-WHEEL-RETAINING DEVICE.

Application filed February 8, 1922. Serial No. 534,971.

*To all whom it may concern:*

Be it known that I, JOHN B. DES ROSIERS, a citizen of the United States, residing at Providence, in the county of Providence, in the State of Rhode Island, have invented a new and useful Emergency-Wheel-Retaining Device, of which the following is a specification.

My invention relates to improved safety attachments for motor vehicles, and more particularly to means whereby upon breakage of the rear axle the wheel attached to the broken portion may be retained in its position.

Another object of this invention is the provision of a safety attachment of the character described which may be readily secured in position on said vehicle, and which, having once been properly attached, is permanent in nature, thus being constantly in position to perform its intended function.

A further object of this invention is the provision of a safety attachment of the character described, which may be secured in position, without the use of bolts, or nuts, or attaching means other than those already present on the vehicle, to which the invention is to be secured.

In certain types of motor vehicles it is common practice to mount the brake drum close to, but slightly removed from the spokes of the wheel, and it is for use upon this type of construction that my invention is particularly designed though it is obvious that with slight modification my invention may be adapted for use on any type of vehicle.

These and such other objects of my invention as may hereinafter appear will be best understood from a description of an embodiment thereof, such as is shown in the accompanying drawings, the embodiment shown being designed for use on the present type of Ford automobiles.

Fig. 1 is a view of the hub portion of a motor vehicle wheel, showing the inner face of a brake drum with my invention attached thereto.

Fig. 2 is an edge view of the parts as shown in Fig. 1,—while.

Figs. 3 and 4 are detail views showing a modified construction.

My invention as illustrated, comprises the curved body portion 1 provided with an inclined slot 2 and having at its two ends the laterally extending portions 3 terminating in the overhanging lips or flanges 4.

When in position, the inclined slot 2 in the body portion 1 of my device engages the bolt 5 which ordinarily extends from the brake disk 6 and by turning the nut 7 my device may be rigidly secured in place upon the brake disk, though it is obvious that any other convenient type of attachment of the body portion 1 to a fixed part of the automobile adjacent to the axle thereof, may be employed. It will now be seen that the laterally extending portions 3 extend transversely across the periphery of the brake drum 8 at diametrically opposite points, and that the lips or flanges 4 overhang the brake drum 8 at points between the outer face 9 of the brake drum 8 and the spokes 10 of the wheel, and extend radially towards the center of the brake drum 8, in a plane parallel to the body portion 1.

Having thus confined both the brake disk 6 and the brake drum 8 between the U-shaped ends of my device, should the axle 11 break, the entire wheel would still be held in position thus preventing possible accident, and rendering it possible to still move the vehicle by means of its own wheels.

In Figs. 3 and 4 will be seen a modified construction of the U-shaped ends of my device wherein provision is made for adjusting the lip or flange 4 to or from the body portion 1, thus increasing or decreasing the distance there-between as may become necessary through any variance in the transverse dimension of different brake drums.

In this modified form the lip or flange 4 is separate from the lateral extension 3, and is formed with a right angle portion 12, terminating in the rib 13, designed when in position to be inserted in any one of a plurality of transverse slots 14 with which the extension 3 is provided, thus determining the location of the lip or flange 4 relative to the body portion 1. To secure the lip or flange 4 in position as described, the portion 12 thereof is provided with the slot 15, through which the screw 16 is passed, said screw 16 being threaded into the laterally extending portion 3, it will be seen that the lip or flange portion may be secured rigidly thereto. This adjustment can be made permanent by riveting or upsetting the inner end of the screw 16 as shown in Fig. 3. It is obvious, however, that any type of means freely or otherwise adjustable for attaching the portion 12 to the extension 3 may be employed.

It is understood that my invention is not limited to the specific embodiment shown, and that various deviations may be made therefrom without departing from the spirit and scope of the appended claims.

Having thus described my invention, what I claim is:

1. An emergency wheel retaining device for vehicles comprising an arcuate member having at each end a flange spaced from and extending inward in substantial parallelism with said end, the flanges being diametrically disposed relatively to the circle described by the radius of said arcuate member, and means for securing said arcuate member to a brake member adjacent to the axle of the vehicle.

2. An emergency wheel retaining device for vehicles, comprising a body portion and devices to secure said body portion to the inner face of the brake disk, said body portion extending half way around the inner face of the brake disk, and being provided at its extremities with retention flanges extending across the periphery of the brake drum at diametrically opposite points thereof, and extending radially, inwardly a short distance of the outer side of the brake drum, adapted to retain the brake drum and brake disk in proper relative position when the axle breaks.

3. An emergency wheel retaining device for vehicles, comprising a body portion, secured to a fixed part adjacent to the axle of the vehicle and provided with a plurality of laterally adjustable clamps, adapted to retain the brake drum and disk in proper relative position.

4. An emergency wheel retaining device for vehicles, comprising an arc shaped body portion, secured to the brake disk, and provided upon its outer periphery at each of its two extremities, with laterally adjustable, retention clamps, extending transversely across the periphery of the brake drum, at diametrically opposite points, and provided with radially disposed retention flanges, adapted to retain the brake drum and disk in proper relative position upon failure of normal means therefor.

5. An adjustable emergency wheel retaining device for vehicles, comprising a body portion, extending half way around the inner face of the brake disk, and being provided at its extremities with flanges extending across the periphery of the brake drum at diametrically opposite points thereof, means securing said body portion to the inner face of the brake disk L shaped clamping members, and means adjustably attaching said clamping members to the projecting flanges of the body portion to retain said brake drum and brake disk in proper relative position to permit towage of the vehicle when the axle breaks.

JOHN B. DES ROSIERS.